United States Patent [19]

Essaff et al.

[11] Patent Number: 4,812,961
[45] Date of Patent: Mar. 14, 1989

[54] CHARGE PUMP CIRCUITRY HAVING LOW SATURATION VOLTAGE AND CURRENT-LIMITED SWITCH

[75] Inventors: Robert Essaff, Fremont; Robert C. Dobkin, San Jose, both of Calif.

[73] Assignee: Linear Technology, Inc., Milpitas, Calif.

[21] Appl. No.: 50,896

[22] Filed: May 15, 1987

[51] Int. Cl.⁴ .............................................. H02M 3/18
[52] U.S. Cl. .......................................... 363/61; 363/63
[58] Field of Search ...................... 363/59, 60, 61, 63

[56] References Cited

U.S. PATENT DOCUMENTS 2,056,376 10/1936 Travis ..................................... 363/59
4,679,134 7/1987 Bingham et al. ...................... 363/61

FOREIGN PATENT DOCUMENTS 0080264 5/1982 Japan ..................................... 363/60
0230462 12/1984 Japan ..................................... 363/60

Primary Examiner—Patrick R. Salce
Assistant Examiner—Kristine Peckman
Attorney, Agent, or Firm—Flehr, Hohbach, Test, Albritton & Herbert

[57] ABSTRACT

A charge pump circuit is integrated form utilizes a dual emitter transistor switch having low saturation voltage. The low saturation voltage for the transistor is provided by deriving a base bias voltage from the doubled voltage ($2V_{cc}$) and a collector voltage from the voltage supply ($V_{cc}$). Current-limiting for the transistor is provided by connecting one emitter to the base bias circuitry whereby the second emitter acts as a collector when the transistor saturates, thereby limiting the base drive and causing current-limiting.

7 Claims, 1 Drawing Sheet

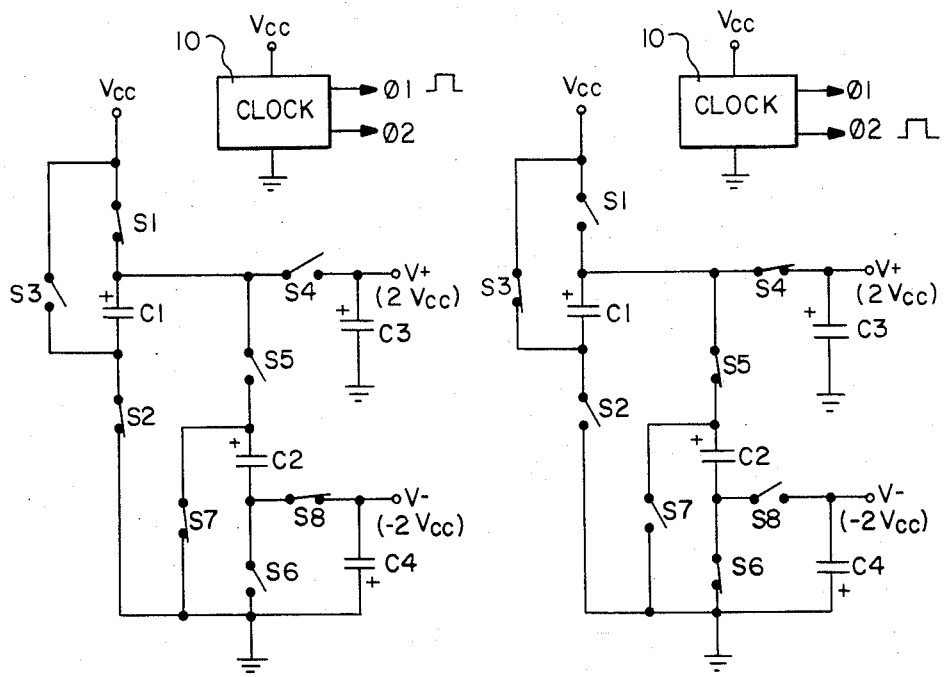
FIG.—1A    FIG.—1B
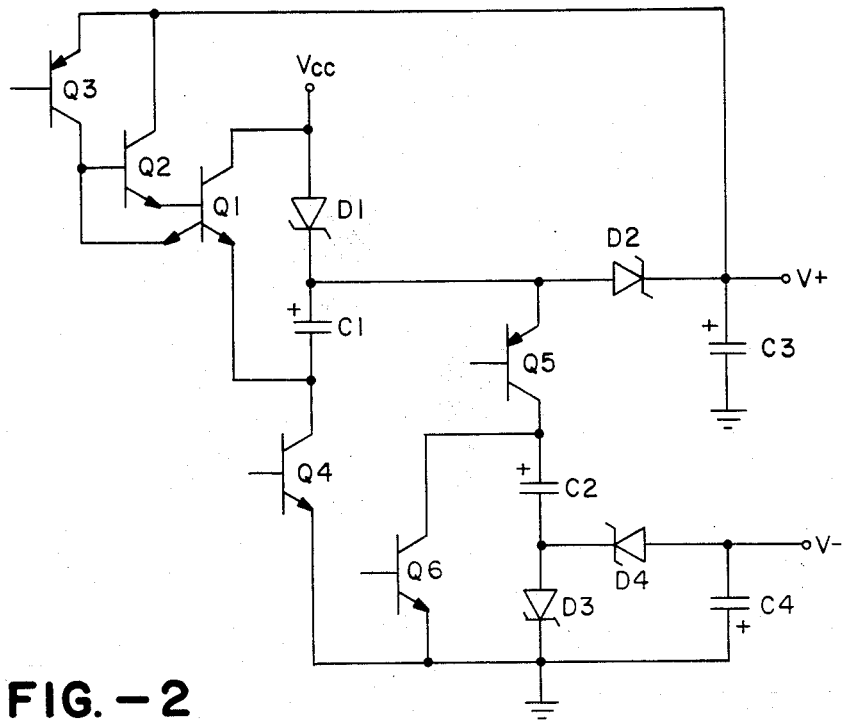
FIG.—2

CHARGE PUMP CIRCUITRY HAVING LOW SATURATION VOLTAGE AND CURRENT-LIMITED SWITCH

BACKGROUND OF THE INVENTION

This invention relates generally to charge pump circuitry for generating positive and negative voltage potentials using a single supply voltage source, and more particularly the invention is directed to a charge pump integrated circuit.

The technique of doubling a voltage from a supply voltage source by switchably charging a capacitor and altering the capacitor terminals with respect to the voltage source is well known. Such a charge pump enables flexibility in circuit operation by providing a plurality of voltage potentials to circuit elements.

SUMMARY OF THE INVENTION

The present invention is directed to an integrated circuit functioning with discrete capacitors as a charge pump in doubling a voltage from a voltage source and providing both positive and negative voltages therefrom. A feature of the invention is the use of a transistor switch having a low saturation voltage. Another feature of the invention is a switch that is current-limited and thus limits the supply currents when charging a capacitor.

The invention and objects and features thereof will be more readily apparent from the following detailed description and appended claims taken with the drawing, in which:

BRIEF DESCRIPTION OF THE DRAWINGS

FIGS. 1A and 1B are schematics illustrating operation of a charge pump integrated circuit in accordance with the invention.

FIG. 2 is a schematic of one embodiment of a charge pump integrated circuit in accordance with the invention.

DETAILED DESCRIPTION OF ILLUSTRATIVE EMBODIMENT

Referring now to the drawings, FIGS. 1A and 1B illustrate operation of a charge pump integrated circuit in accordance with the invention. The circuit has two-phase operation in charging a capacitor and then transferring charge from the capacitor to generate positive and negative voltage potentials from a simple voltage source. The circuit comprises a terminal connected to a voltage source, $V_{cc}$, and a terminal connected to a circuit ground potential. Four discrete capacitors C1-C4 are interconnected between the supply voltage $V_{cc}$ and the ground potential by eight switches S1-S8 that are selectively closed in response to the two-phase clock 10.

During phase $\phi 1$, as illustrated in FIG. 1A, switches S1 and S2 serially interconnect capacitor C1 between the supply voltage $V_{cc}$ and circuit ground, thereby developing a voltage potential across capacitor C1 of $V_{cc}$. Switch S7 connects one terminal of capacitor C2 to ground, and switch S8 connects the other terminal of capacitor C2 to a $-V$ terminal, at which a voltage of $-V_{cc}$ will be generated.

During Phase $\phi 2$, as illustrated in FIG. 1B, switches S1, S2, S7 and S8 are opened, and switch S3 connects the source voltage $V_{cc}$ to the negative terminal of capacitor C1. The positive terminal of capacitor C1 is interconnected through switch S4 to a $+V$ terminal and charges capacitor C3 to a voltage potential of twice the supply voltage or $2V_{cc}$. The doubled supply voltage, $2V_{cc}$, is applied also through switch S5 to a terminal of capacitor C2, the other terminal of which is interconnected to ground through switch S6. Thus, a voltage potential of $2V_{cc}$ is stored on capacitor C2 and capacitor C3.

On the following Phase $\phi 1$ of the clock, the positive terminal of capacitor C2 is tied to ground through switch S7, thereby causing the doubled voltage stored on capacitor C2 to appear on the negative terminal of capacitor C2. The doubled negative voltage is then stored in capacitor C4 through switch S8. Thus, a $V+$ voltage of $2V_{cc}$ and a $V-$ voltage of $-2V_{cc}$ are provided across capacitors C3 and C4, respectively.

In designing the circuitry of FIGS. 1A and 1B (less capacitors C1-C4) in integrated circuit form, it is important to have a switch S3 transistor with a low saturation voltage and which is current-limited in operation. This is achieved in the circuitry of FIG. 2 which corresponds to the circuitry of FIGS. 1A and 1B. In this circuit, a Schottky diode D1 functions as switch S1, transistor Q4 functions as switch S2, a dual-emitter transistor Q1 functions as switch S3, a Schottky diode D2 functions as switch S4, a transistor Q5 functions as switch S5, Schottky diode D3 functions as switch S6, transistor Q6 functions as switch S7 and Schottky diode D4 functions as switch S8.

In this embodiment, the dual-emitter transistor Q1 is an NPN transistor; a PNP transistor could be employed but would be larger in size. In order for an NPN transistor to have a low saturation voltage, the base of the transistor must be driven by a voltage that is greater than the collector voltage. This is accomplished in FIG. 2 with the base drive circuitry comprising transistors Q2 and Q3 which are interconnected to the self-generated $V+$ supply ($2V_{cc}$), thus providing transistor Q1 with a base voltage greater than the collector voltage ($V_{cc}$). Accordingly, the dual-emitter transistor Q1 will function with low saturation voltage.

Due to the nature of the circuit design, the current drawn from the $V+$ potential will be one-half of the supply current from $V_{cc}$. Thus, in order to keep the supply current at its lowest, the transistors Q1 must be current-limited. This is accomplished by connecting one emitter of transistor Q1 to the base drive circuitry comprising transistors Q2 and Q3. Thus, when transistor Q1 saturates, the second emitter acts as a collector and limits the base drive, thereby causing current-limiting.

Charge pump circuitry in accordance with the invention has proved to be particularly advantageous in an integrated circuit. As described, the circuit functions with low saturation voltage and is current-limited, thereby limiting the supply current. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

We claim:
1. A charge pump circuit comprising
a supply terminal for connecting to a voltage source, $V_{cc}$, a ground terminal for connecting to a ground potential, a first capacitor serially connected with first and second switch means between said supply terminal and said ground terminal, a third switch means connected in parallel with said first switch means and said first capacitor, a second capacitor serially connected with fourth and fifth switch means between the common terminal of said first switch means and said first capacitor and said ground terminal, a third capacitor serially connected with a sixth switch means between said ground potential and the common terminal of said first switch means and said first capacitor, the common terminal of said third capacitor and said sixth switch means connected to a positive voltage ($+2V_{cc}$) terminal, a fourth capacitor serially connected with a seventh switch means between said ground potential and the common terminal of said second capacitor and said fifth switch means, the common terminal of said fourth capacitor and said seventh switch means connected to a negative voltage ($-2V_{cc}$) terminal, and an eighth switch means connected in parallel with said second capacitor and said fifth switch means, whereby closure of said first, second, seventh and eighth switch means during a first operational phase generates a voltage $V_{cc}$ across said first capacitor, and closure of said third, fourth, fifth and sixth switch means during a second operational phase transfers a voltage $+2V_{cc}$ to said second and third capcitors, and during a subsequent first operational phase a voltage $-2V_{cc}$ is transferred to said fourth capacitor.

2. The charge pump circuit as defined by claim 1 wherein said third switch means comprises a bipolar transistor having a base, collector and emitter, and further including biasing circuitry interconnecting said positive voltage $+2V_{cc}$ to the base of said bipolar transistor whereby said bipolar transistor has a low saturation voltage.

3. The charge pump circuit as defined by claim 2 wherein said bipolar transistor comprises a dual-emitter transistor, one emitter being connected to said biasing circuitry whereby saturation of said transistor limits base drive and thereby causes current-limiting in said transistor.

4. The charge pump circuit as defined by claim 3 wherein said circuitry comprises an integrated circuit and discrete capacitors.

5. The charge pump circuit as defined by claim 4 wherein said first switch means comprises a Schottky diode, said second switch means comprises a bipolar transistor, said fourth switch means comprises a bipolar transistor, said fifth switch means comprises a bipolar transistor, said sixth switch means comprises a Schottky diode, said seventh switch means comprises a Schottky diode, and said eighth switch means comprises a Schottky diode.

6. In a charge pump circuit in which voltage, $V_{cc}$, developed across a first capacitor by connecting voltage terminals of said first capacitor to a voltage source and charging said first capacitor from said voltage source, is doubled to a voltage $2V_{cc}$ and transferred to a second capacitor by reversing the terminal connections of said first capacitor to said voltage source using a dual-emitter bipolar transistor switch, said bipolar transistor having a base, a collector and two emitters, a method of limiting source current in said dual-emitter bipolar transistor comprising the steps of providing bias circuitry for said bipolar transistor switch with the base bias for said bipolar transistor switch being derived from said second capacitor ($2V_{cc}$), and a collector voltage derived from said voltage source ($V_{cc}$), thereby operating said bipolar transistor with low saturation voltage, and connecting one emitter of said dual-emitter bipolar transistor switch to said bias circuitry whereby operation of said transistor is current-limited.

7. The method as defined by claim 6 wherein said dual-emitter bipolar transistor is a dual-emitter NPN transistor, said step of providing bias circuitry comprising providing a PNP bipolar transistor and an NPN bipolar transistor, each having a base, collector and emitter, the emitter of said PNP transistor and the collector of said NPN transistor of said bias circuitry transistors being connected to receive the voltage $2V_{cc}$, the collector of said PNP transistor being connected to the base of said NPN transistor, the emitter of said NPN transistor being connected to the base of said dual-emitter transistor being connected to the base of said NPN transistor and the collector of said PNP transistor.

* * * * *

UNITED STATES PATENT AND TRADEMARK OFFICE
CERTIFICATE OF CORRECTION

PATENT NO. : 4,812,961
DATED : March 14, 1989
INVENTOR(S) : ROBERT ESSAFF et al.

It is certified that error appears in the above—identified patent and that said Letters Patent is hereby corrected as shown below:

In the cover page, change the name of the assignee from "Linear Technology, Inc." to --Linear Technology Corporation--.

Signed and Sealed this

Tenth Day of October, 1989

Attest:

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,812,961
DATED : March 14, 1989
INVENTOR(S) : Essaff et al.

It is certified that error appears in the above-identified patent and that said Letters Patent is hereby corrected as shown below:

Title page,
Item [73], Assignee, please change "Linear Technology, Inc." to -- Linear Technology Corporation --.

Signed and Sealed this

Eighteenth Day of October, 2005

JON W. DUDAS
*Director of the United States Patent and Trademark Office*